United States Patent
Roberts

(10) Patent No.: US 10,480,996 B2
(45) Date of Patent: Nov. 19, 2019

(54) LIGHT FIXTURE WITH INTEGRATED SENSOR

(71) Applicant: IDEAL Industries Lighting LLC, Sycamore, IL (US)

(72) Inventor: John Roberts, Durham, NC (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 45 days.

(21) Appl. No.: 14/732,167

(22) Filed: Jun. 5, 2015

(65) Prior Publication Data
US 2016/0195434 A1 Jul. 7, 2016

Related U.S. Application Data

(63) Continuation-in-part of application No. 14/589,319, filed on Jan. 5, 2015, now Pat. No. 10,234,121.

(51) Int. Cl.
*G01J 1/04* (2006.01)
*G01J 1/42* (2006.01)
*F21S 8/02* (2006.01)
*F21V 23/04* (2006.01)

(52) U.S. Cl.
CPC ............. *G01J 1/0418* (2013.01); *F21S 8/026* (2013.01); *F21V 23/0471* (2013.01); *G01J 1/0488* (2013.01); *G01J 1/42* (2013.01); *G01J 2001/4247* (2013.01)

(58) Field of Classification Search
CPC ......... F21V 1/00; G01J 1/0418; G01J 1/0488; G01J 1/42
See application file for complete search history.

(56) References Cited

U.S. PATENT DOCUMENTS

| 4,321,594 A | 3/1982 | Galvin et al. |
| 4,787,722 A | 11/1988 | Claytor |
| 6,531,817 B1 | 3/2003 | Holtslag et al. |

(Continued)

OTHER PUBLICATIONS

Cunningham, Paul D. et al., "Broadband terahertz characterization of the refractive index and absorption of some important polymeric and organic electro-optic materials," Journal of Applied Physics, vol. 109, No. 4, 2011, American Institute of Physics, pp. 043505-043505-5.

(Continued)

*Primary Examiner* — Jong-Suk (James) Lee
*Assistant Examiner* — Christopher E Dunay
(74) *Attorney, Agent, or Firm* — Withrow & Terranova, P.L.L.C.

(57) ABSTRACT

A lighting fixture includes a light source, a housing coupled to the light source, a light sensor, and a sensor cover over the light sensor and coupled to the housing. The housing includes an opening through which light generated by the light source is emitted towards an area of interest, and an exposed surface that reflects light such that the housing appears at a first color. The sensor cover includes a front surface that reflects light such that the sensor cover appears at a second color, which is substantially similar to the first color, and has an average transmittance greater than 10% within a desired wavelength band. By providing the sensor cover with the reflectance and average transmittance as described, a functional sensor cover that aesthetically blends with a lighting fixture is achieved.

13 Claims, 20 Drawing Sheets

(56) References Cited

U.S. PATENT DOCUMENTS

| | | | |
|---|---|---|---|
| 6,948,831 B1* | 9/2005 | Naqvi | F21S 8/02 |
| | | | 362/148 |
| 9,029,781 B2 | 5/2015 | Huang | |
| 2007/0177384 A1* | 8/2007 | Sibalich | F21S 8/088 |
| | | | 362/276 |
| 2008/0150757 A1* | 6/2008 | Hutchison | G08G 1/095 |
| | | | 340/907 |
| 2008/0198583 A1 | 8/2008 | McMillen | |
| 2011/0253516 A1* | 10/2011 | Figueroa | H01H 9/161 |
| | | | 200/297 |
| 2013/0120963 A1* | 5/2013 | Holland | F21V 7/0066 |
| | | | 362/84 |
| 2013/0126739 A1* | 5/2013 | Oi | G01J 1/0266 |
| | | | 250/353 |
| 2015/0382432 A1 | 12/2015 | Eskonen et al. | |
| 2016/0123816 A1* | 5/2016 | Pei | G01J 5/12 |
| | | | 374/121 |
| 2016/0286619 A1* | 9/2016 | Roberts | H05B 33/0854 |
| 2016/0377275 A1 | 12/2016 | Lim et al. | |

OTHER PUBLICATIONS

Horwitz, James W., "Infrared refractive index of polyethylene and a polyethylene-based material," Optical Engineering, vol. 50, No. 9, Sep. 2011, SPIE, pp. 093603-093603-3.

O'Shea, Donald C., "Elements of Modem Optical Design," John Wiley & Sons, Inc., Aug. 14, 1985, New York, 6 pages.

Non-Final Office Action for U.S. Appl. No. 14/589,319, dated Jan. 12, 2017, 14 pages.

Final Office Action for U.S. Appl. No. 14/589,319, dated May 17, 2017, 13 pages.

Advisory Action for U.S. Appl. No. 14/589,319, dated Sep. 28, 2017, 3 pages.

Non-Final Office Action for U.S. Appl. No. 14/589,319, dated Mar. 22, 2018, 12 pages.

Final Office Action for U.S. Appl. No. 14/589,319, dated Jul. 12, 2018, 17 pages.

Notice of Allowance for U.S. Appl. No. 14/589,319, dated Oct. 29, 2018, 15 pages.

* cited by examiner

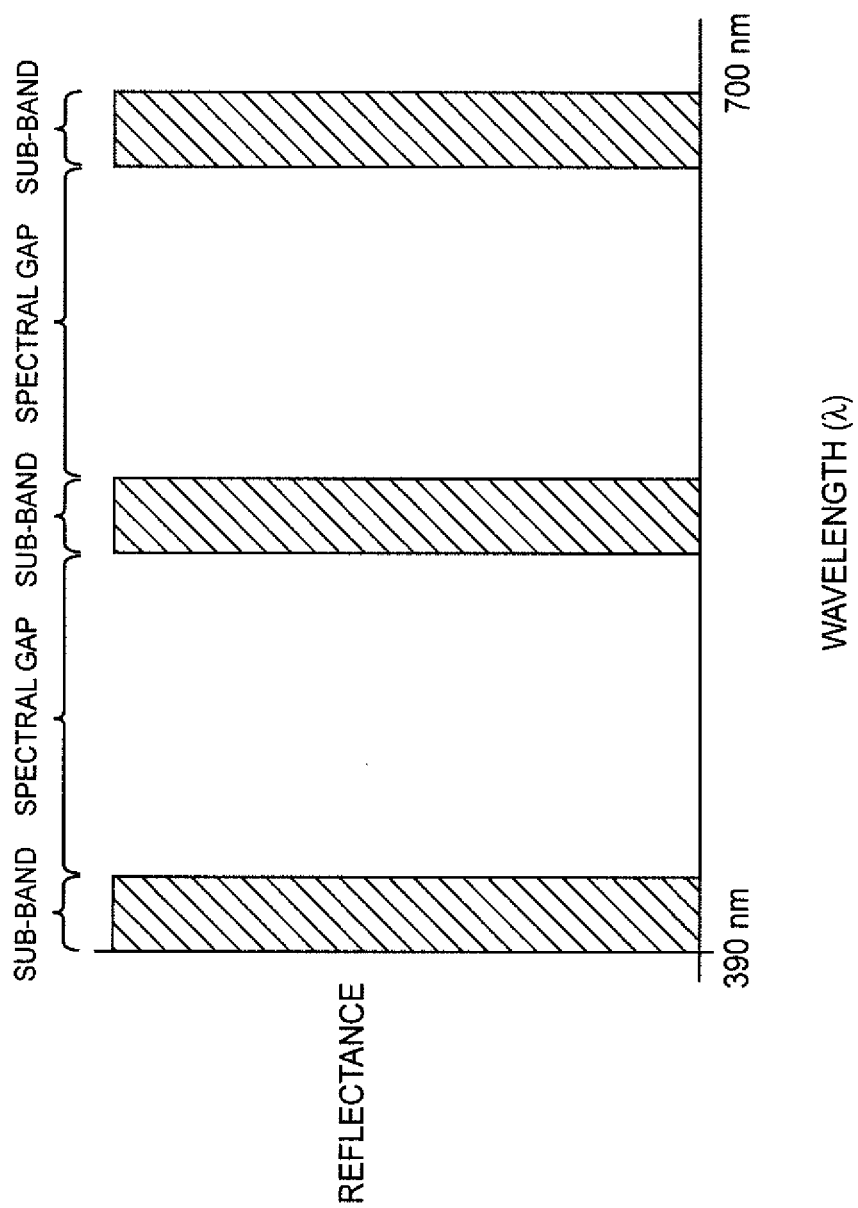

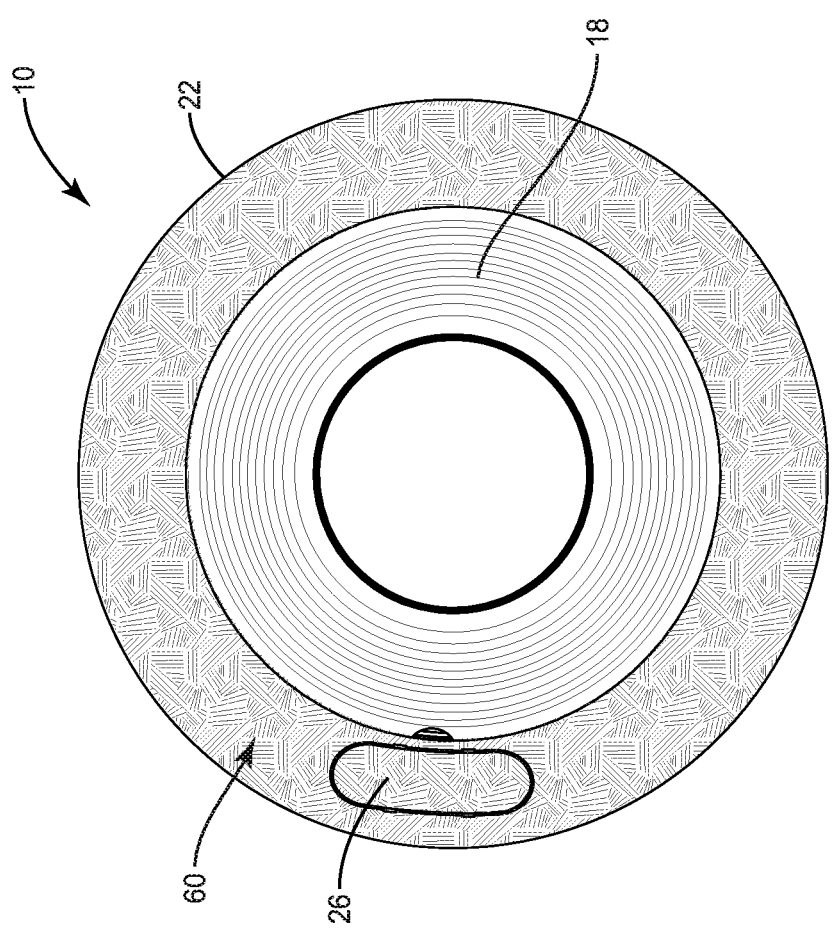

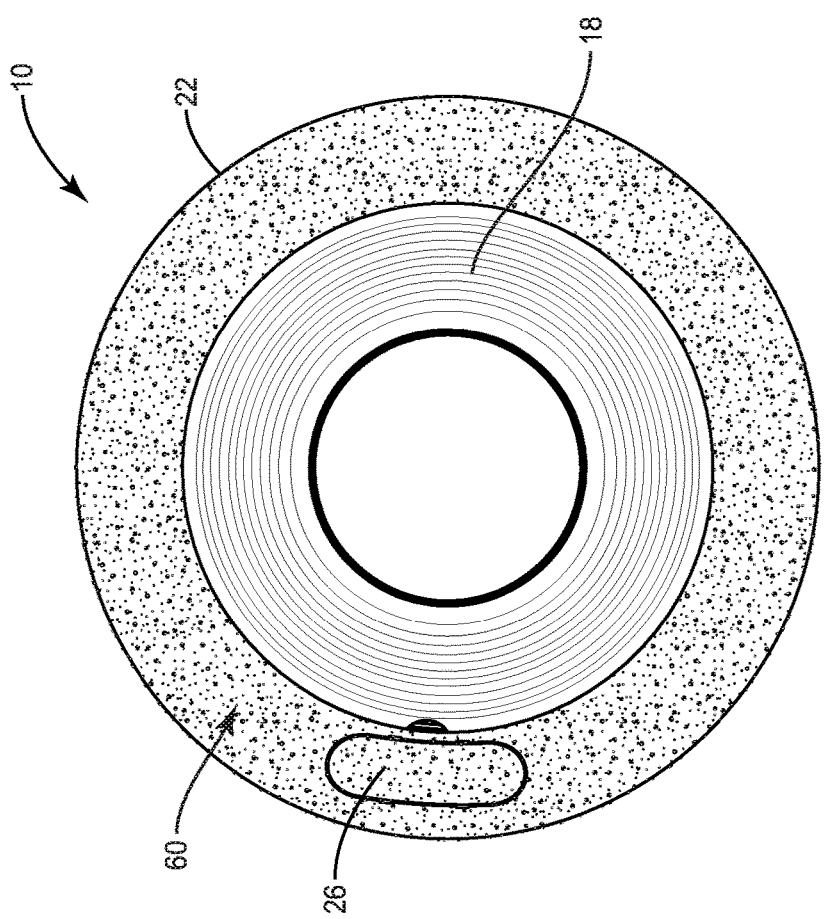

LIGHT FIXTURE WITH INTEGRATED SENSOR

RELATED APPLICATIONS

This application is a continuation-in-part of U.S. patent application Ser. No. 14/589,319, filed Jan. 5, 2015, now U.S. Pat. No. 10,234,121, entitled "FLAT TRIM RING LENS FOR OCCUPANCY SENSORS," the disclosure of which is incorporated herein by reference in its entirety.

FIELD OF THE DISCLOSURE

The present disclosure relates to sensor modules for lighting fixtures.

BACKGROUND

Modern lighting fixtures continue to evolve, incorporating features such as controllers, sensors, remote modules, and the like. These controllers, sensors, and remote modules may allow a lighting fixture to implement lighting programs, respond to the surrounding environment, and be controlled, for example, over a local area network and/or the Internet. A number of different sensors may be incorporated into a lighting fixture in order to provide information about the surrounding environment. For example, a lighting fixture may include an ambient light sensor to gather information about the ambient light level in the area around the lighting fixture. Additionally, a lighting fixture may include an occupancy sensor to detect when an individual is located near the lighting fixture. While incorporating these sensors into a lighting fixture often provides valuable information that can be used to implement additional functionality, many sensors such as those mentioned above that measure light of one kind or another must have a line-of-sight to the surrounding environment. Further, it is often desirable to give these light sensors access to the largest possible area surrounding a lighting fixture in order to provide the maximum amount of information about the surrounding area. In other cases, it is desirable to provide a precise detection area for a light sensor. Generally, the particular goal of the light sensor will dictate the extent of the desirable coverage area.

When incorporating a sensor into a sensor module, the sensor generally must be covered by a sensor cover of some kind. Due to the requirements of many light-based sensors discussed above (i.e., line-of-sight to surrounding environment and access to a large surrounding area), sensor modules incorporating light sensors often include bulky and aesthetically unappealing sensor covers. For example, many conventional sensor modules include dome shaped sensor covers, and therefore substantially extrude from a lighting fixture, detracting from the aesthetic appeal thereof. Due to the size of these sensor module covers, many are located remotely from the lighting fixtures that they service, requiring separate installation and providing only limited information about the area directly surrounding the lighting fixture itself.

Accordingly, there is a need for a sensor module for a lighting fixture including a compact sensor cover suitable for mounting on the lighting fixture itself that blends with the aesthetics of the lighting fixture in order to provide a desirable appearance.

SUMMARY

The present disclosure relates to sensor modules for lighting fixtures. In one embodiment, a lighting fixture includes a light source, a housing coupled to the light source, a light sensor, and a sensor cover over the light sensor and coupled to the housing. The housing includes an opening through which light generated by the light source is emitted towards an area of interest, and an exposed surface that reflects light such that the housing appears at a first color. The sensor cover includes a front surface that reflects light such that the sensor cover appears at a second color, which is substantially similar to the first color, and has an average transmittance greater than 10% within a desired wavelength band. By providing the sensor cover with the reflectance and average transmittance as described, a functional sensor cover that aesthetically blends with a lighting fixture is achieved.

In one embodiment, the desired wavelength band includes visible light between about 380 nm and 780 nm. In another embodiment, the desired wavelength band includes infrared energy between 780 nm and 1000 nm. In yet another embodiment, the desired wavelength band includes thermal infrared energy between about 1000 nm and 14 µm.

In one embodiment, the exposed surface of the housing and the front surface of the sensor cover are covered in a continuous visual pattern.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 16A and 16B are graphs illustrating an exemplary reflectance and average transmittance profile of a sensor cover according to one embodiment of the present disclosure.

FIGS. 17A and 17B are front views of the lighting fixture shown in FIG. 1 according to various embodiments of the present disclosure.

DETAILED DESCRIPTION

Figure 1:
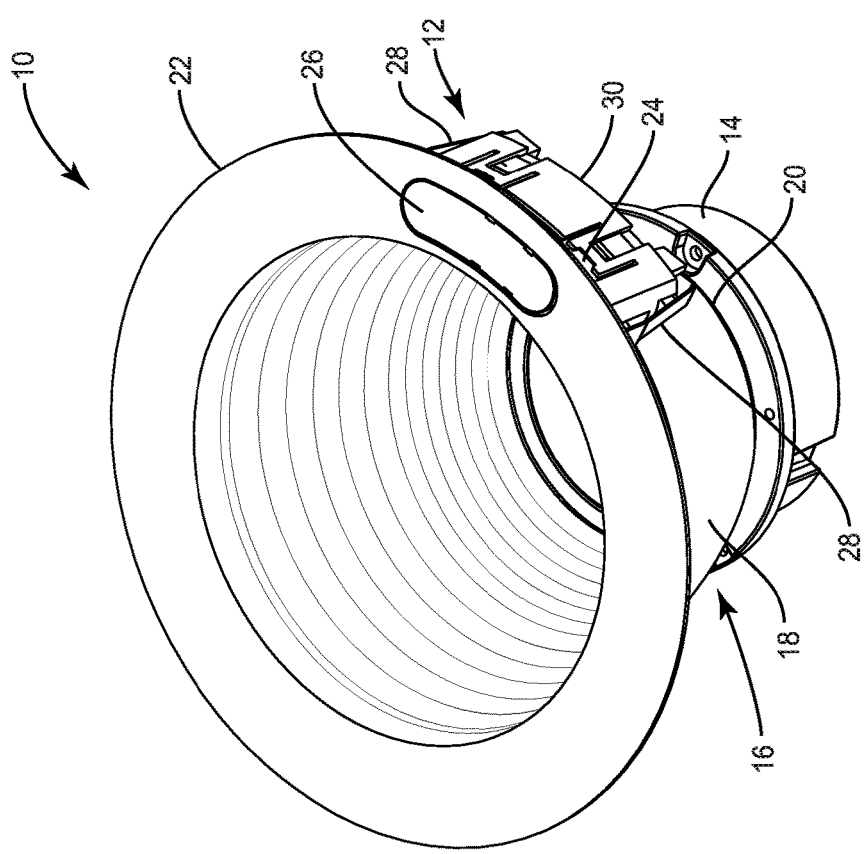
FIG. 1 shows an isometric view of a lighting fixture including a sensor module according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 shows an isometric view of a lighting fixture 10 including a sensor module 12 according to one embodiment of the present disclosure. The lighting fixture 10 is a recessed "can" lighting fixture including a control module 14 and a housing 16. A light source (not shown) is mounted inside the housing 16 and oriented such that light is emitted from the housing 16 and onto a desired area. The electronics (not shown) that are required to power and drive the light source are provided, at least in part, by the control module 14. While the lighting fixture 10 is envisioned to be used predominantly in 4, 5, and 6 inch recessed lighting applications for industrial, commercial, and residential applications, the concepts disclosed herein are applicable to virtually any size lighting fixture suitable for any application.

The housing 16 is cup-shaped and includes a sidewall 18 that extends between a bottom panel 20 at the rear of the housing 16, and a rim, which may be provided by an annular flange 22 at the front of the housing 16. The sensor module 12 is coupled to the sidewall 18 of the housing 16. The sensor module 12 includes one or more sensors (not shown), a module housing 24, and a sensor cover 26. The module housing 24 includes a mounting apparatus for coupling the sensor module 12 to the housing 16 of the lighting fixture 10. In one embodiment, the mounting apparatus may include one or more clips 28, which are inserted into a corresponding tab on the housing 16 to secure the sensor module 12 in place. Notably, the module housing 24 is mounted to the housing 16 of the lighting fixture 10 such that the sensor cover 26 is exposed at the front of the housing 16. The sensor cover 26 covers one or more sensors (not shown) within the sensor module and provides the sensors access to light within a desired area. In the embodiment shown in FIG. 1, the sensor cover 26 is flush-mounted within the annular flange 22. Specifically, the sensor cover 26 fits within a cutout in the annular flange 22 of the lighting fixture 10 such that the sensor cover 26 is integrated into the periphery of the lighting fixture 10.

Notably, the exposed front surface of the sensor cover 26 exposed through the annular flange 22 is substantially flat, such that the sensor cover 26 visually blends with the annular flange 22 and thus increases the aesthetic appeal of the lighting fixture 10. As discussed, above, conventional sensor covers are often bulky and aesthetically unappealing, often relying on shapes such as domes to provide the sensors within access to a desired amount of surrounding light. The sensor cover 26 shown in FIG. 1 provides the sensor with a desired amount of surrounding light, while simultaneously remaining compact and aesthetically appealing. A rear surface (also referred to as a light focusing surface) of the sensor cover 26 includes one or more lens segments in order to focus light from different areas surrounding the sensor cover 26 to the sensors within the sensor module 12, as discussed in detail below.

While the sensor cover 26 is shown as a kidney shape such that the sensor cover 26 is contoured to the annular flange 22 of the housing 16, the sensor cover 26 may be any shape. For example, the sensor cover 26 may be a square, a rectangle, a circle, or any other irregular shape without departing from the principles disclosed herein. Further, while the exposed surface of the sensor cover 26 is substantially flat, there may be one or more peripheral ridges in the sensor cover, for example, to properly secure the sensor cover 26 into the opening in the annular flange 22. Finally, while the sensor cover 26 is shown mounted in the annular flange 22 of the housing 16, the sensor cover 26 (and the sensor module 12 in general) may be mounted to any portion of the lighting fixture 10 without departing from the principles disclosed herein.

Once the lighting fixture 10 is in place, the face of the annular flange 22 may form part of a decorative trim ring assembly that rests flush against a surface, such as a drywall ceiling, into which the lighting fixture 10 is recessed. The exposed portion of the inside surface of the sidewall 18 may also form part of the decorative trim ring assembly that extends into the ceiling. As such, when the lighting fixture 10 is mounted in a ceiling, the primary portions of the lighting fixture that are typically visible are the face of the annular flange 22, the exposed inner portions of the sidewall 18, and the light source (not shown), which may be covered by a lens (not shown).

The control module 14 and the housing 16 may be integrated and provided by a single structure. Alternatively, the control module 14 and the housing 16 may be modular, wherein different sizes, shapes, and types of control modules 14 may be attached or otherwise connected to the housing 16 and used to drive the light source provided therein. In some embodiments, the control module 14 may be coupled to a heat sink (not shown) in order to divert heat away from the electronics therein.

While the concepts disclosed herein are primarily discussed with relation to a recessed lighting fixture as shown in FIG. 1, the concepts may be readily applied to any type of lighting fixture including but not limited to troffer-type fixtures, luminaries, pendants, or the like. The shape and size of the sensor module 12 and the sensor cover 26 may vary when used with different types of lighting fixtures in order to best integrate with the lighting fixture.

Figure 2:
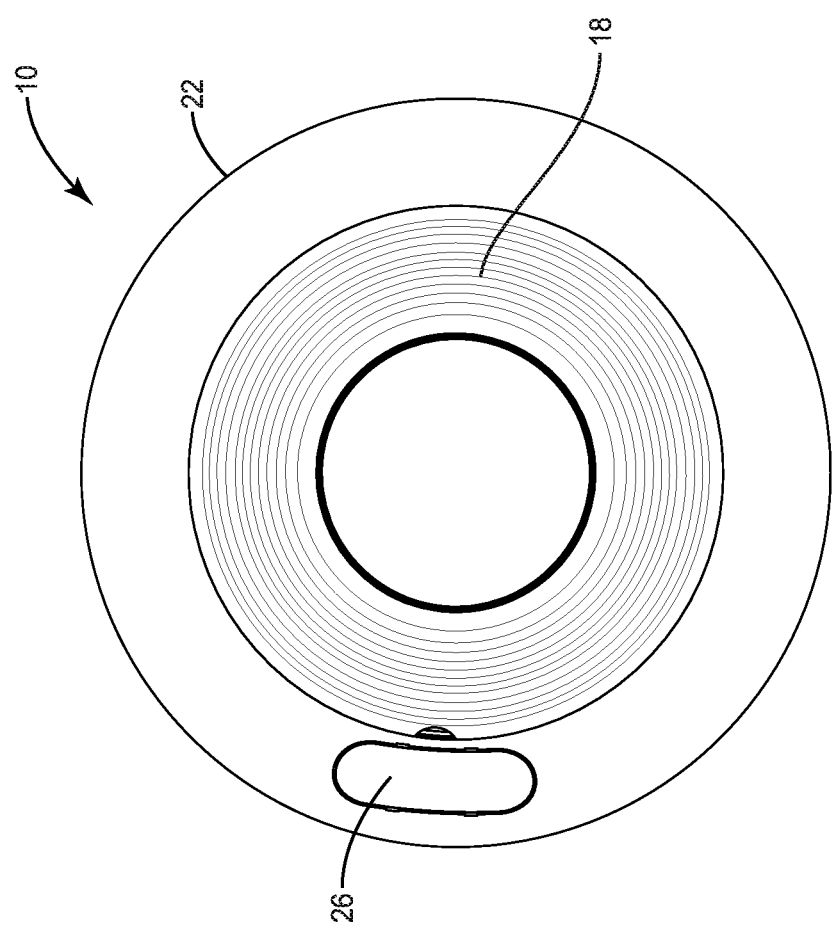
FIG. 2 shows a front view of the lighting fixture shown in FIG. 1 according to one embodiment of the present disclosure.

FIG. 2 shows a front view of the lighting fixture 10 according to one embodiment of the present disclosure. As shown in FIG. 2, the front of the annular flange 22 surrounds the inner portion of the housing 16, and includes the sensor cover 26 mounted in a cut-out therein. The sensor cover 26 may be flush-mounted with the annular flange 22 such that the sensor cover 26 visually blends with the annular flange 22 and provides a desirable aesthetic appearance of the lighting fixture 10.

Figure 3:
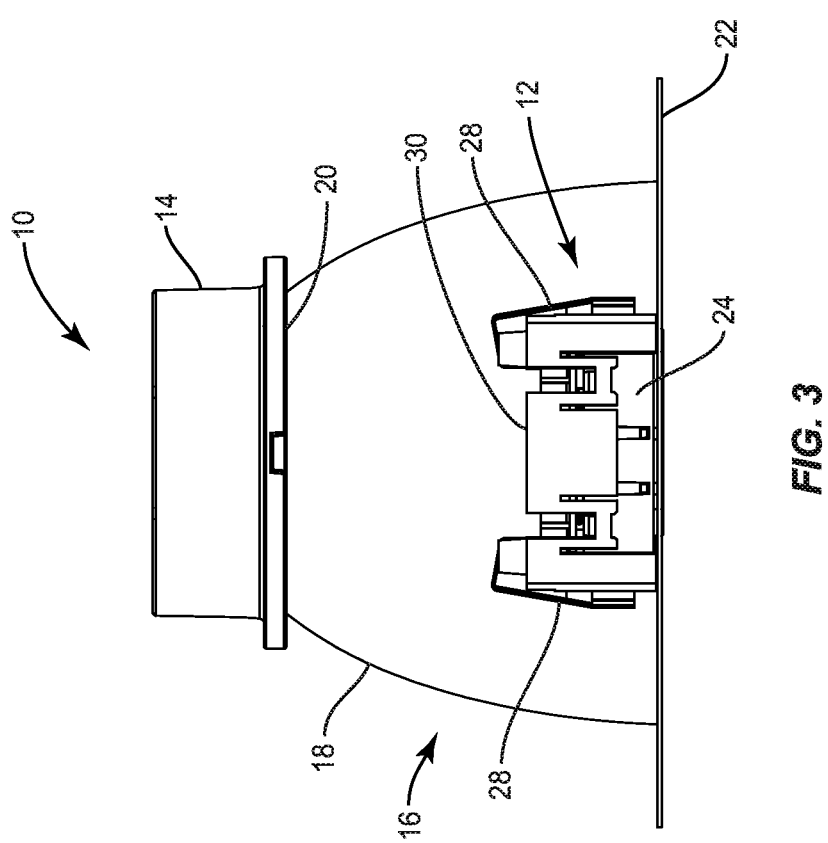
FIG. 3 shows a side view of the lighting fixture shown in FIG. 1 according to one embodiment of the present disclosure.

FIG. 3 shows a side view of the lighting fixture 10 including the sensor module 12 mounted to the housing 16 according to one embodiment of the present disclosure. In one embodiment, a sensor module mount 30 may be coupled to the housing 16 and configured to receive and secure the sensor module 12 to the housing 16. The clips 28 described above may couple to the sensor module mount 30 thereby securing the sensor module 12 in place. While a specific sensor module 12 and sensor module mount 30 are shown, any suitable mounting structure may be used to secure the sensor module 12 without departing from the principles described herein.

Figure 4:
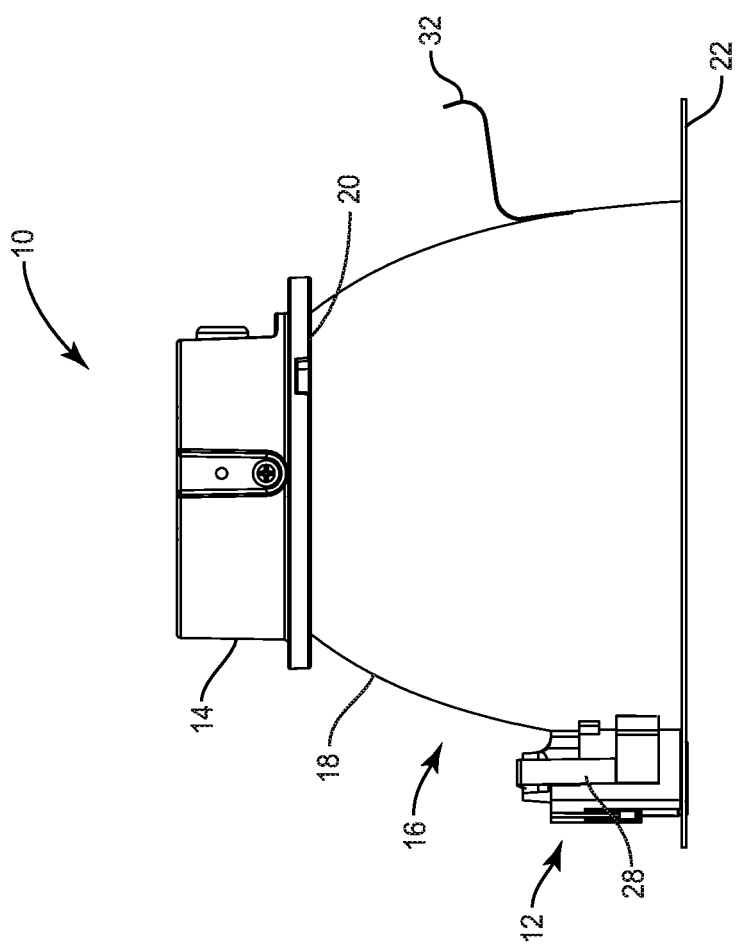
FIG. 4 shows an additional side view of the lighting fixture shown in FIG. 1 according to one embodiment of the present disclosure.

FIG. 4 is an additional side view of the lighting fixture including the sensor module 12 mounted to the housing 16 according to one embodiment of the present disclosure. FIG. 4 also shows a mounting clip 32 secured to the housing 16 and radially extending therefrom. Additional mounting clips 28 are generally provided but not shown. The mounting clips 28 are designed to affix the lighting fixture inside a cylindrical recessed lighting housing (not shown) for new or remodel construction. The mounting clips 28 effectively press against the inside surface of the recessed lighting housing, and, via a friction fit, hold the lighting fixture 10 inside of the recessed lighting housing.

FIGS. 5 through 8 show details of the sensor cover 26 according to one embodiment of the present disclosure. The sensor cover 26 includes a front surface 34, a rear surface 36 (also referred to herein as a light-focusing surface), and an outer periphery 38. While the outer periphery 38 of the sensor cover 26 is shown as a kidney shape such that the sensor cover 26 contours to the annular flange 22 shown above, the outer periphery 38 of the sensor cover 26 may be any shape without departing from the principles of the present disclosure. As discussed above, the front surface 34 of the sensor cover 26 may be substantially flat, thereby allowing the sensor cover 26 to visually blend in with a lighting fixture with which it is integrated. The rear surface 36 of the sensor cover 26 includes a number of lens sections 40, each configured to focus light from a different area surrounding the sensor cover 26 to a sensor. As discussed herein, the area presented to the front surface 34 of the sensor cover 26 is referred to as an area of interest. As the sensor cover 26 will generally be integrated into a lighting fixture, the area of interest is thus the area directly below and around the lighting fixture, and may correspond with the area that light is provided to from a light source within the lighting fixture. Notably, each one of the lens sections 40 is configured to focus light (which may be, for example, infrared light with a wavelength between 7 to 14 microns as is typical for that radiated from the human body) from a different portion of the area of interest such that together the lens sections 40 provide light to a sensor that covers the entirety of the area of interest. As discussed above, it is often desirable to maximize the area of interest, as this provides the sensors in the sensor module 12 a larger amount of data. In turn, control circuitry in the lighting fixture or remote to the lighting fixture may make more informed decisions regarding, for example, the light provided from a light source within the lighting fixture. In other situations, it may be desirable to provide a precise boundary for the area of interest and/or to maximize the uniformity of light detection within the area of interest.

Figure 5:
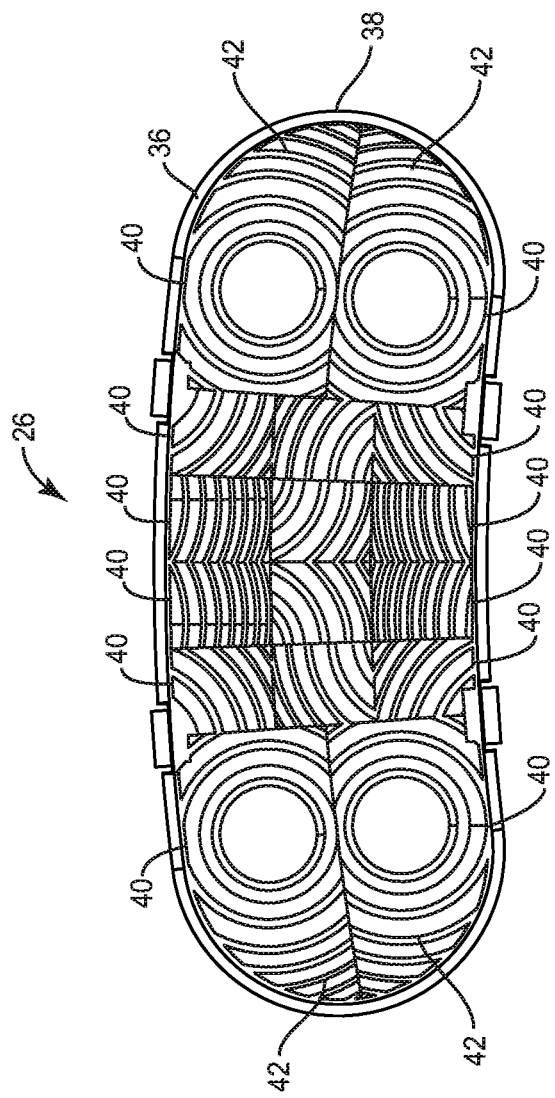
FIG. 5 shows a rear view of a sensor cover according to one embodiment of the present disclosure.
Figure 6:
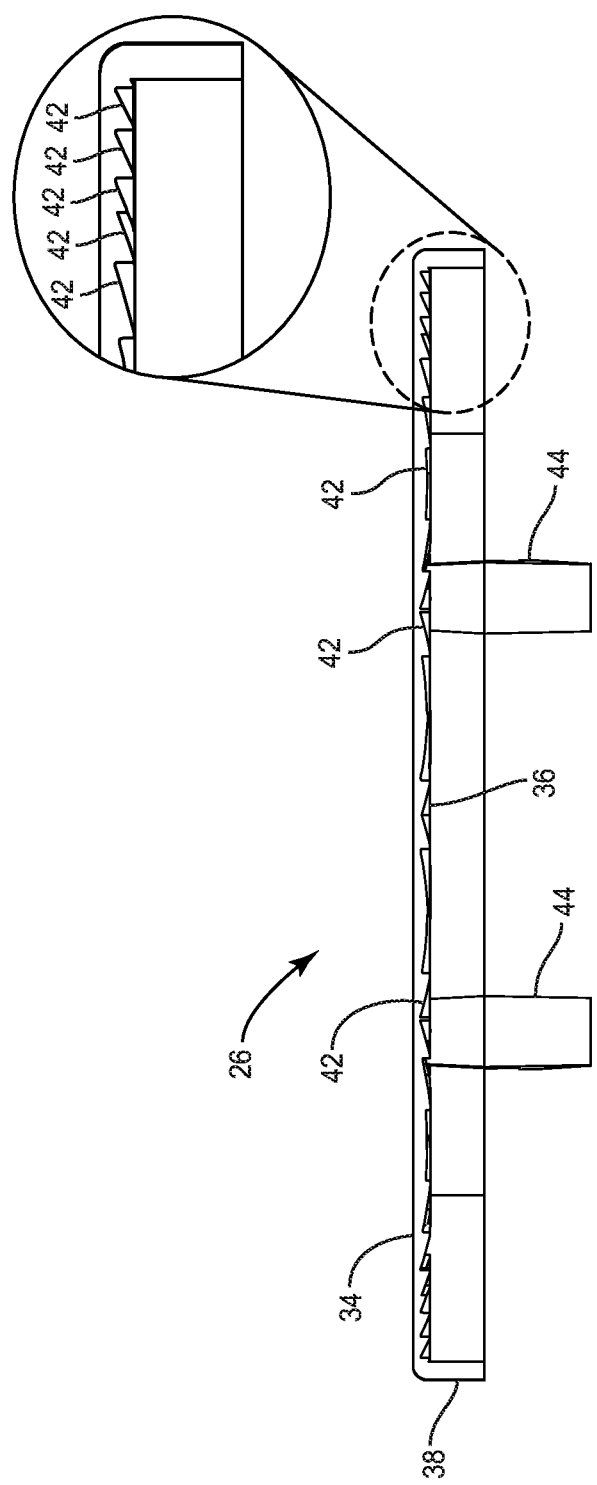
FIG. 6 shows a side view of the sensor cover shown in FIG. 5 according to one embodiment of the present disclosure.
Figure 7:
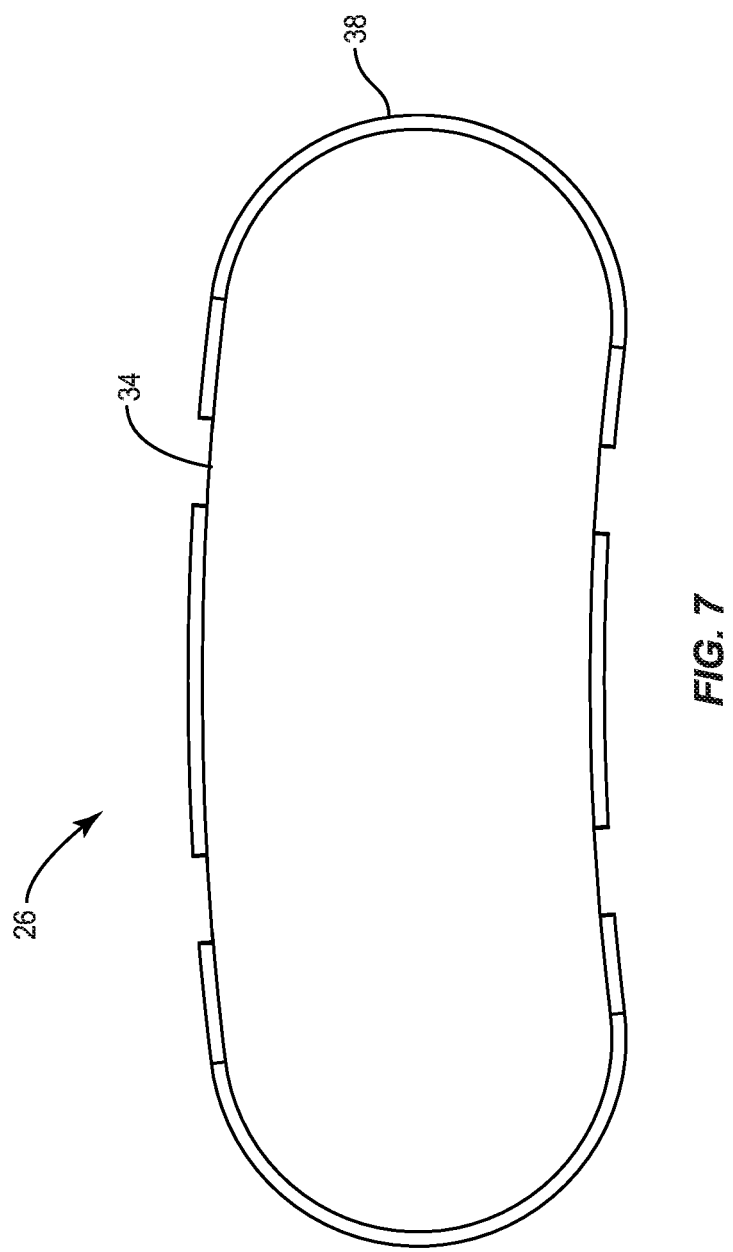
FIG. 7 shows a front view of the sensor cover shown in FIG. 5 according to one embodiment of the present disclosure.
Figure 8:
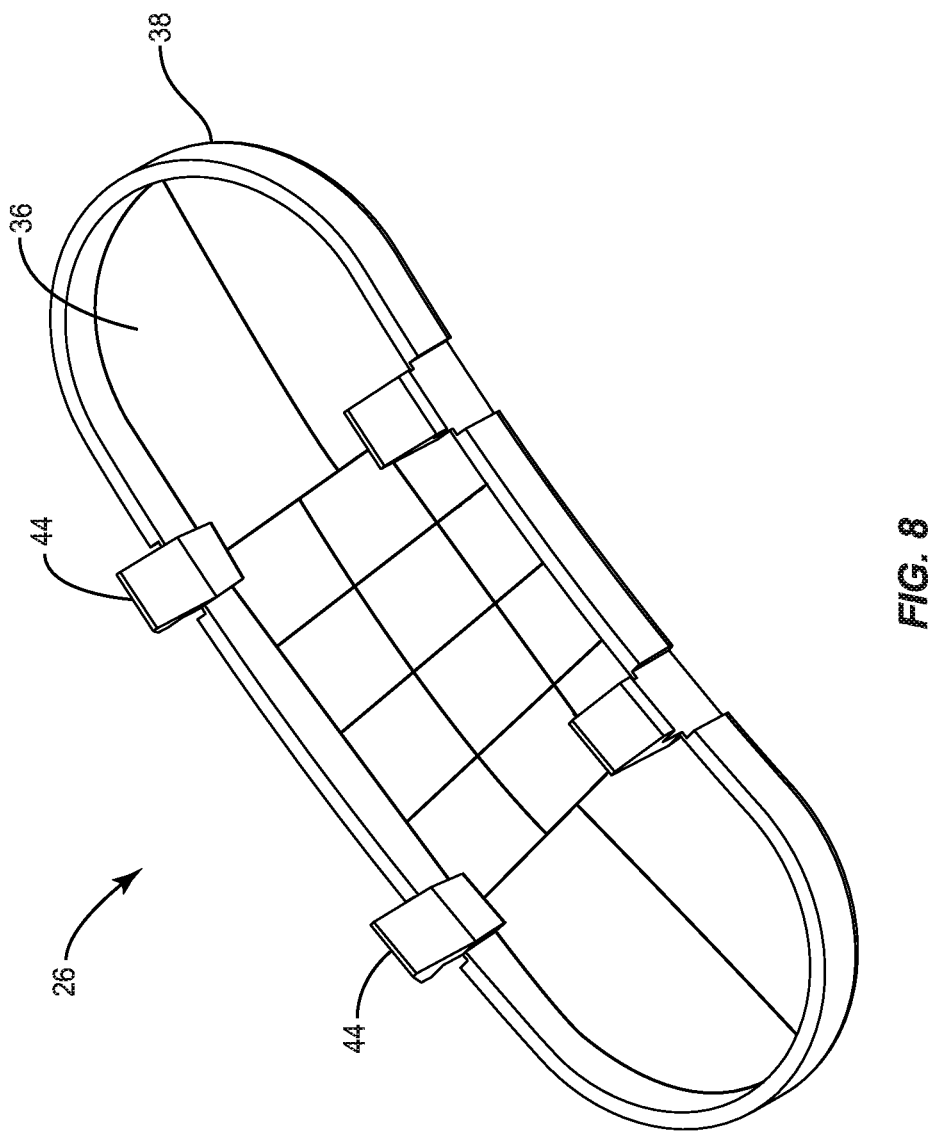
FIG. 8 shows an isometric view of the sensor cover shown in FIG. 5 according to one embodiment of the present disclosure.

In one embodiment, each one of the lens sections 40 is a Fresnel lens. While Fresnel lenses are often not of sufficient quality for use with imaging optics, they provide large aperture and short focal lengths while remaining relatively compact, and can be very effective for non-imaging optics. Fresnel lenses may have a flat front surface, with an opposite light-focusing surface including a number of ridges, referred to herein as Fresnel ridges, used to focus light incident to a focal point. Accordingly, FIGS. 5 and 6 show a number of Fresnel ridges 42 in each one of the lens segments. The Fresnel ridges 42 are formed and arranged such that each one of the lens sections 40 is configured to focus light, which may be infrared light, from a different portion of the area of interest to one or more focal points. Generally, these focal points will correspond with the location of a sensor in the sensor module 12. Accordingly, data from a relatively large area of interest may be provided to one or more sensors in the sensor module 12. The Fresnel ridges 42 may each have a different angle, thereby producing a different refraction pattern. Details of the Fresnel ridges 42 are shown in FIG. 6. The overall refraction from a collection of the Fresnel ridges 42 in each lens sections 40 forms a desired aperture and focal length, thereby providing a desirable response.

The sensor cover 26 includes a number of mounting clips 44. The mounting clips 44 are configured to interlock with either the annular flange 22 or a portion of the sensor module 12 itself in order to secure the sensor cover 26 in place. In one embodiment, the sensor cover 26 may include a peripheral flange that extends over the outer periphery 38 of the sensor cover such that the peripheral flange lays flat against the front surface of the annular flange 22 and thus holds the sensor cover 26 in place on the front surface of the annular flange 22. While the front surface 34 of the sensor cover 26 is discussed and shown being substantially flat, the front surface 34 of the sensor cover 26 may include one or more peripheral ridges, or may be patterned or textured in any way in order to further integrate the sensor cover 26 with the visual appearance of the lighting fixture with which it is integrated. Generally, providing a substantially flat front surface 34 of the sensor cover 26 allows the sensor cover 26 to "blend in" with a lighting fixture with which it is integrated, making it substantially less noticeable than conventional sensor modules. This is especially true if the color of the front surface 34 of the sensor cover 26 is the same as the surface of the lighting fixture with which the sensor cover 26 is integrated, as it may be in some embodiments.

As discussed above, the sensor cover 26 is primarily for use with light-based sensors. Specifically, the sensor cover 26 is primarily for use with infrared light-based sensor to detect human occupancy. In one embodiment, the sensor cover 26 may be used with an ambient light sensor. In an additional embodiment, the sensor cover 26 may be used with an occupancy sensor. As discussed above, occupancy sensors are often infrared light sensors. Accordingly, the sensor cover 26 may be configured to pass infrared light within the area of interest to the sensor. The sensor cover 26 may be formed by any suitable material. In one embodiment, the sensor cover 26 is formed from high density polypropylene (HDPP) or high density poly-ethylene (HDPE).

The sensor cover 26 may be manufactured by any number of processes. In one embodiment, the sensor cover 26 is molded via an injection molding process. In another embodiment, the sensor cover 26 is milled out of a piece of material, for example, via a computer numerical control (CNC) router or mill. In yet another embodiment, the sensor cover 26 may be printed via a three-dimensional (3D) printer.

Figure 9:
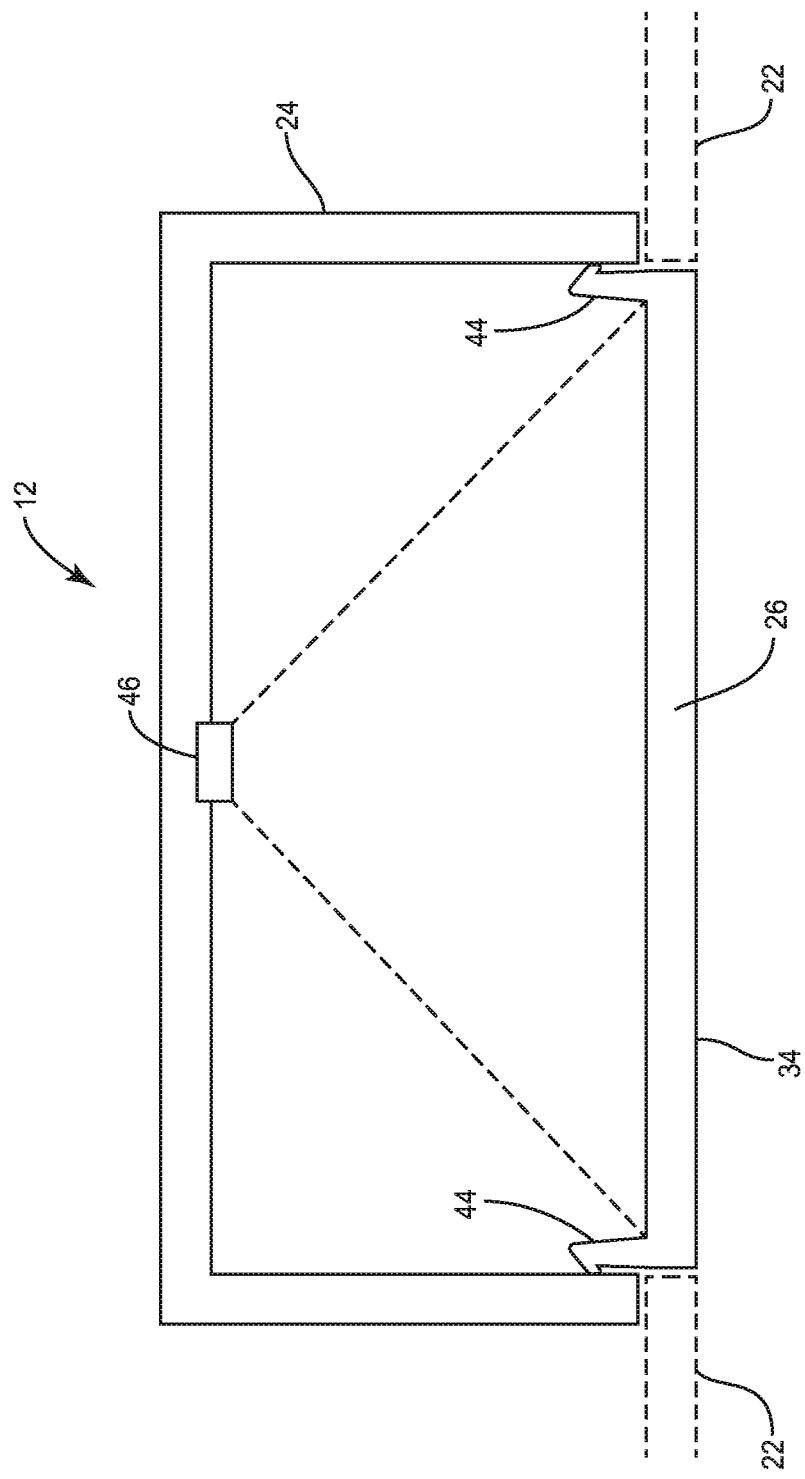
FIG. 9 shows a cross-sectional view of a sensor module according to one embodiment of the present disclosure.

FIG. 9 shows details of the sensor module 12 utilizing the sensor cover 26 shown in FIGS. 5 through 8 according to one embodiment of the present disclosure. As discussed above, the module housing 24 surrounds a sensor 46. The sensor 46 is covered by the sensor cover 26 such that the lens sections 40 focus light from different portions of the surrounding environment to the sensor 46. The mounting clips 44 of the sensor cover 26 engage with the module housing 24 to secure the sensor cover 26 in place. The front surface 34 of the sensor cover 26 is substantially flush with the annular flange 22 of the lighting fixture 10.

Figure 10:
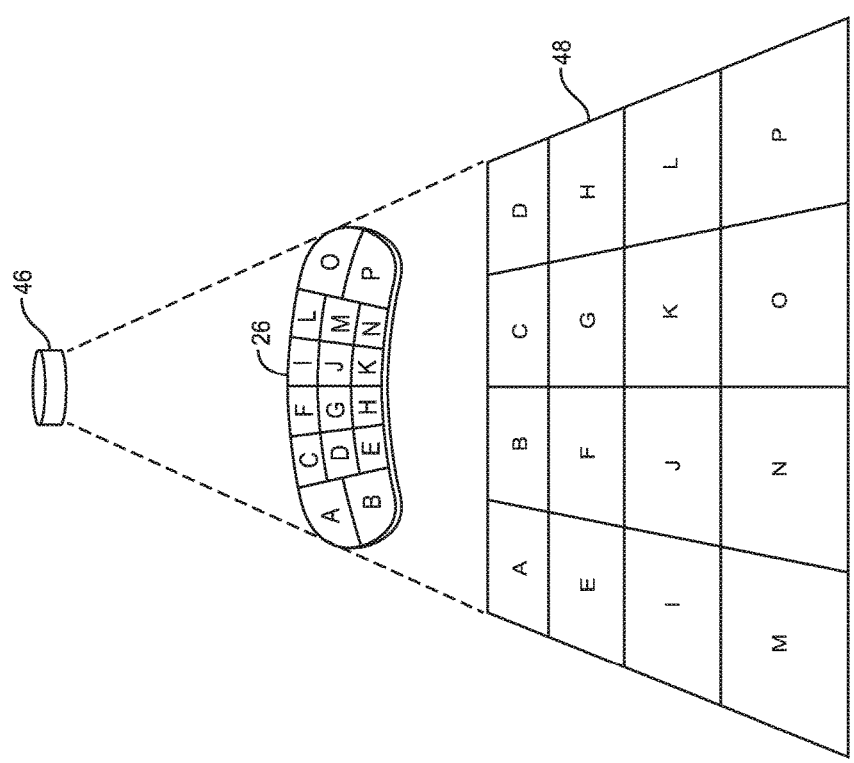
FIG. 10 is a diagram illustrating the operation of a sensor cover according to one embodiment of the present disclosure.

FIG. 10 shows details of the operation of the sensor cover 26 according to one embodiment of the present disclosure. Specifically, FIG. 10 shows an area of interest 48 in front of the front surface 34 of the sensor cover 26, and the sensor 46 aligned with a focal point behind the rear surface 36 of the sensor cover 26. The area of interest 48 is broken up into a number of sections (A-P). Each one of the lens sections 40 is configured to focus light from one of the sections (A-P) of the area of interest 48, such that together the lens sections 40 provide the sensor 46 with information about the entire area of interest 48. The particular portion of the area of interest 48 captured by a particular lens section 40 is merely exemplary. That is, each lens section 40 may not focus light from any one of the different sections (A-P) of the area of interest 48 without departing from the principles of the present disclosure. As discussed above, the sensor 46 may be an ambient light sensor or an infrared occupancy sensor.

The area of interest 48 is defined by a width $W_{AI}$ and a height $H_{AI}$, which are referred to collectively as a field of view (FOV). As discussed above, it is often desirable to maximize the FOV in order to provide the sensor with as much information as possible about the surrounding environment. In other embodiments, having a specific range for the FOV is desirable.

Due to the design of the sensor cover 26, a working distance $WD_{AI}$ of 12.5 ft may provide a circular area of interest 48 with a diameter of 19 ft for a field of view of the circular area of about 1.8 steradian (area/distance$^2$ or $(19/2$ ft$)^2\pi/12.5$ ft$^2$). Frequently, FOV is used for an angle subtended to horizontal, vertical, or diagonal distance of the area, respectively, and to utilize the largest angle of the angle corresponding to the diagonal. For a circular area, FOV is frequently used for the angle subtended to the diameter, which is about 75° in one embodiment.

Figure 11:
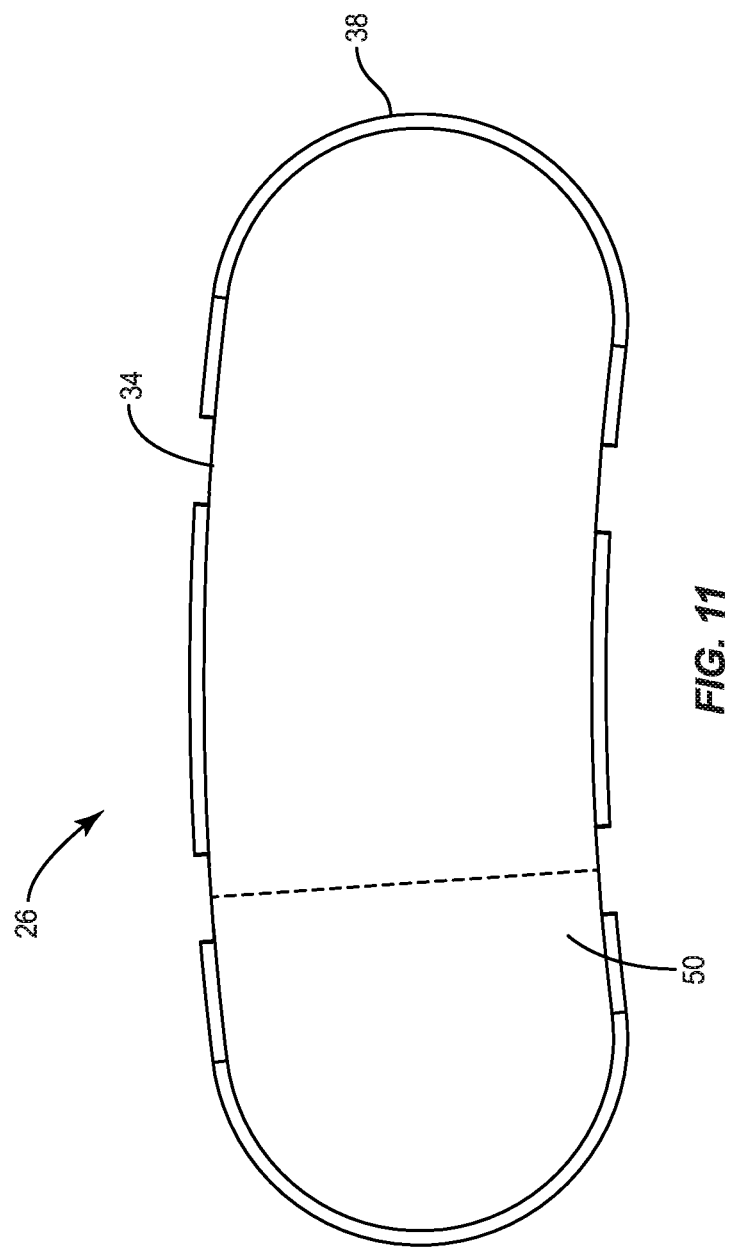
FIG. 11 is a front view of a sensor cover according to an additional embodiment of the present disclosure.

FIG. 11 shows the sensor cover 26 according to an additional embodiment of the present disclosure. The sensor cover 26 in FIG. 11 is substantially similar to that described above with respect to FIGS. 5 through 8, but further includes a transparent section 50, which does not include any Fresnel ridges 42. Accordingly, light passes through the transparent section 50 of the sensor cover 26 unfocused, while light is focused via the lens sections 40 as discussed above. In one embodiment, a first sensor 46A is placed behind the lens sections 40, while a second sensor 46B is placed behind the transparent section 50 of the sensor cover 26. The first sensor 46A may be one that requires access to light information within a relatively large area of interest, while the second sensor 46B may be one that only requires access to light information directly below the sensor cover 26. In one embodiment, the first sensor 46A is an occupancy sensor, while the second sensor 46B is an ambient light sensor. Dividing the sensor cover 26 into the transparent section 50 and the lens sections 40 allows the sensor cover 26 to service multiple sensors while providing a substantially uniform front surface, thereby improving the aesthetic appeal of the sensor cover 26.

Figure 12:
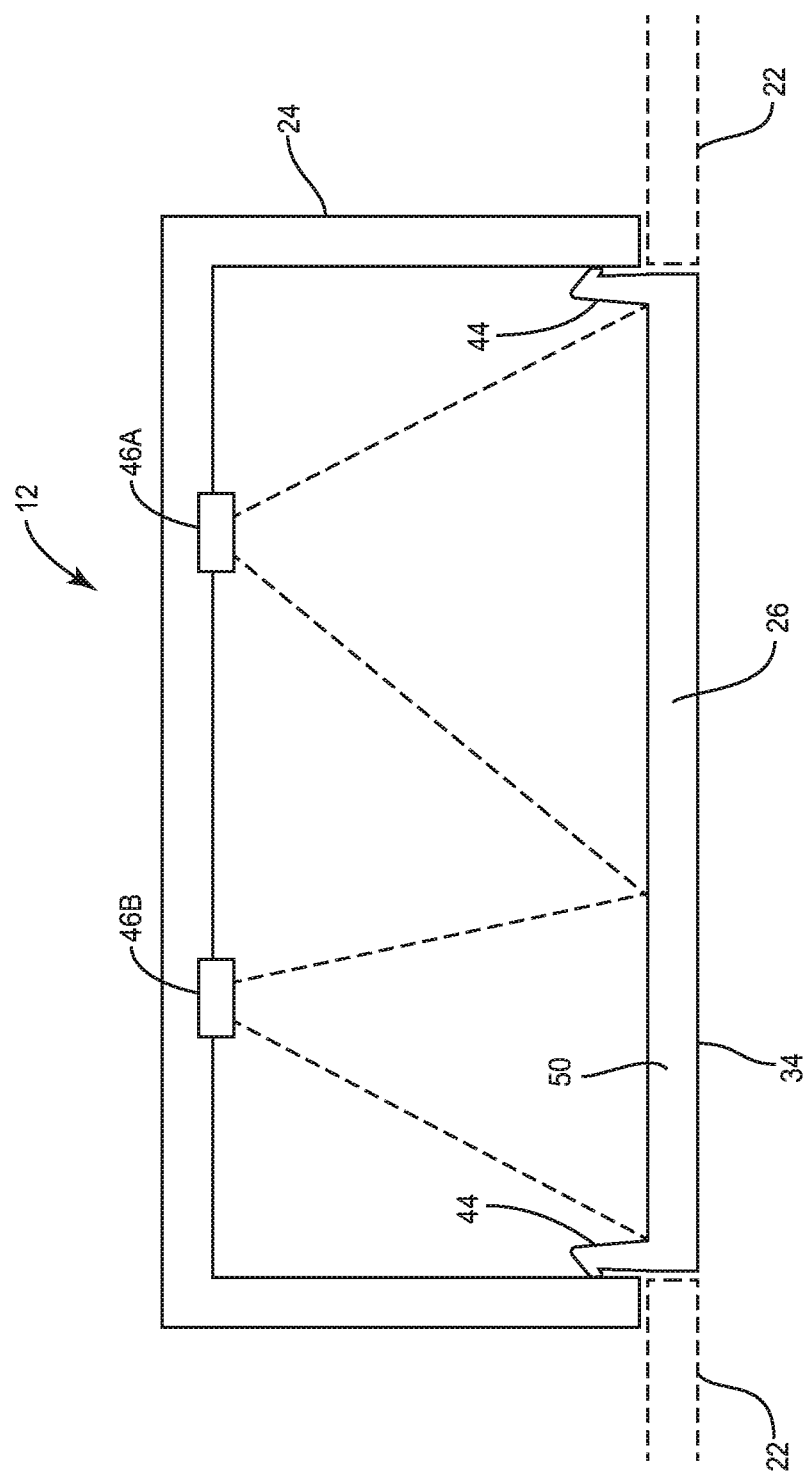
FIG. 12 is a cross-sectional view of a sensor module according to an additional embodiment of the present disclosure.

FIG. 12 shows details of the sensor module 12 utilizing the sensor cover 26 shown in FIG. 11 according to one embodiment of the present disclosure. As discussed above, the module housing 24 surrounds the first sensor 46A and the second sensor 46B. The first sensor 46A is behind the lens sections 40 of the sensor cover 26 such that light from different portions of the surrounding environment is focused onto the first sensor 46A, while the second sensor 46B is behind the transparent section 50 of the sensor cover 26 such that unfocused light is passed to the second sensor 46B. A divider (not shown) may be provided between the first sensor 46A and the second sensor 46B in order to prevent the leakage of light between the separate sections of the sensor cover 26. The mounting clips 44 of the sensor cover 26 engage with the module housing 24 to secure the sensor cover 26 in place. The front surface 34 of the sensor cover 26 is substantially flush with the annular flange 22 of the lighting fixture 10.

Figure 13:
FIGS. 13A through 13C illustrate sensor covers according to various embodiments of the present disclosure.

FIGS. 13A through 13C show the sensor cover 26 according to additional embodiments of the present disclosure. Specifically, FIG. 13A shows the sensor cover 26 wherein the outer periphery 38 of the sensor cover 26 is circular in shape. FIG. 13B shows the sensor cover 26 wherein the outer periphery 38 of the sensor cover 26 is square in shape. FIG. 13C shows the sensor cover 26 wherein the outer periphery 38 of the sensor cover 26 is rectangular in shape. The particular shape of the outer periphery 38 of the sensor cover 26 will be chosen based on the particular needs of the application for which it is being used. For example, different types of lighting fixtures may present different areas, shapes, and visual appearances that mandate different shapes for the sensor cover 26. In general, the sensor cover 26 is a shape that is able to minimize the visual impact of the sensor cover 26 and therefore blend in with the lighting fixture.

Figure 14:
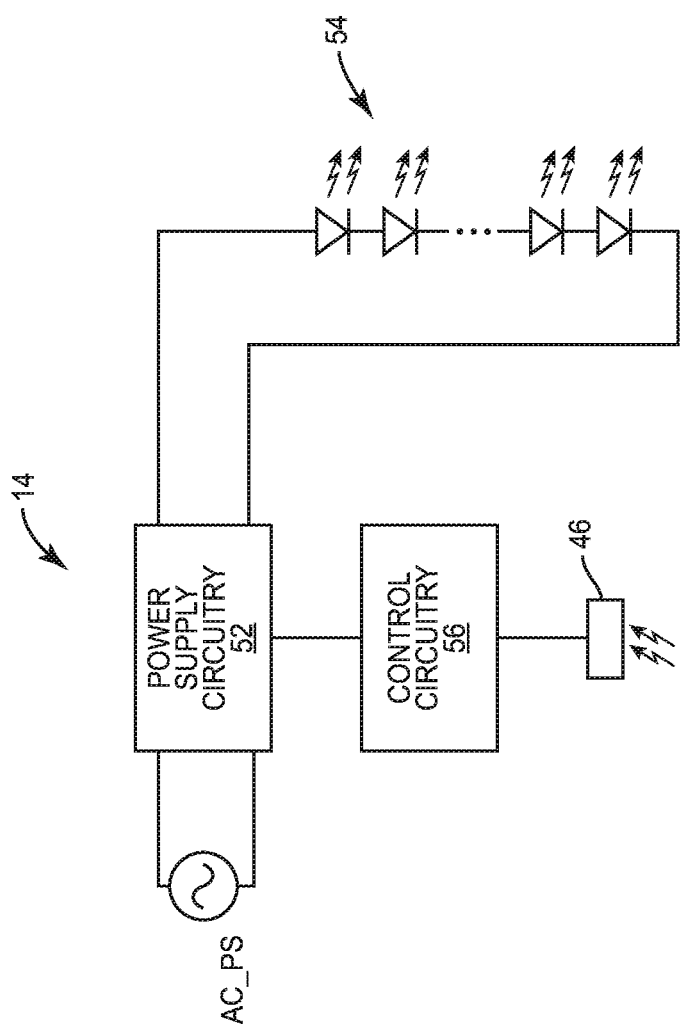
FIG. 14 illustrates circuitry for a lighting fixture according to one embodiment of the present disclosure.

FIG. 14 shows details of the control module 14 of the lighting fixture 10 according to one embodiment of the present disclosure. The control module 14 includes power supply circuitry 52 coupled to a solid-state light source 54. In one embodiment, the solid-state light source 54 includes a number of light emitting diodes (LEDs) coupled in series. Additional parallel strings of LEDs may be present in the solid-state light source 54 in some embodiments. The power supply circuitry 52 is additionally coupled to an alternating current (AC) power source AC_PS, such as a commercial or residential power line. Control circuitry 56 is also present in the lighting fixture 10. The control circuitry 56 is coupled to the sensor 46 (and may be coupled to more than one sensor in some embodiments) and the power supply circuitry 52. In operation, the control circuitry 56 receives one or more measurements from the sensor 46 and provides a power supply control signal to the power supply circuitry 52 in order to control a light output of the solid-state light source 54. Accordingly, the sensor 46 may influence the light output of the solid-state light source 54.

As discussed above, it may be desirable in certain applications for the sensor cover 26 to visually blend with the annular flange 22 or any other portion of the lighting fixture 10 with which it is integrated in order to provide a desirable aesthetic appearance. One way to visually blend the sensor cover 26 with the lighting fixture 10 is to substantially match the perceived color of the sensor cover 26 to a surface of the lighting fixture 10 and/or a sensor module with which the sensor cover 26 is integrated. However, the sensor cover 26 must be colored in such a way as to still remain functional. That is, the sensor cover 26 must maintain a minimum average transmittance within a desired wavelength or band of wavelengths such that the sensor 46 receives a minimum amount of energy necessary to function. In one embodiment, an exterior surface of the lighting fixture 10 such as the visible surface of the annular flange 22 may reflect visible light within a first wavelength or band of wavelengths. Since the exterior surface of the lighting fixture 10 is generally opaque, the exterior surface will generally reflect and/or absorb much of the visible and non-visible light incident thereto. The particular wavelength or wavelengths of visible light reflected by the exterior surface of the lighting fixture 10 determine the perceived color of the exterior surface. The sensor cover 26 may be colored in order to reflect a similar wavelength or wavelengths as the exterior surface of the lighting fixture such that the sensor cover 26 appears to be the same or a similar color as the exterior surface of the lighting fixture 10. For example, if an exterior surface of the lighting fixture 10 is a grey color, the sensor cover may be colored such that it is a similar grey color. Further, the sensor cover 26 may be colored in order to maintain a minimum average transmittance within a desired wavelength or band of wavelengths, which are delivered to the sensor 46 in order to provide the functionality thereof. In one embodiment, the desired wavelength or band of wavelengths include visible light between 380 nm and 780 nm. In another embodiment, the desired wavelength or band of wavelengths include infrared energy between 780 nm and 1000 nm. In yet another embodiment, the desired wavelength or band of wavelengths include thermal infrared energy between 1000 nm and 14 μm. Accordingly, the sensor cover 26 may be used with many different sensors 46 such as ambient light sensors, infrared occupancy sensors, imaging sensors, and the like.

In one embodiment, the sensor cover 26 is colored via one or more dyes introduced into the material of the sensor cover 26 during manufacturing. In another embodiment, the sensor cover 26 is colored via a film placed over the front surface 34 of the sensor cover 26, for example, the sensor cover 26 may be colored via a multi-layer interference thin-film coating deposited on the front surface 34 of the sensor cover 26. In yet another embodiment, the sensor cover 26 is colored via a paint or dye applied to the front surface 34 of the sensor cover 34. In general, the sensor cover 26 may be colored via any suitable means without departing from the principles of the present disclosure. In certain embodiments, the particular dyes, pigments, paints, or the like may be specifically chosen to reflect certain wavelengths of light while absorbing others to achieve a desired filtration effect for light passing through the sensor cover 26.

Figure 15A:
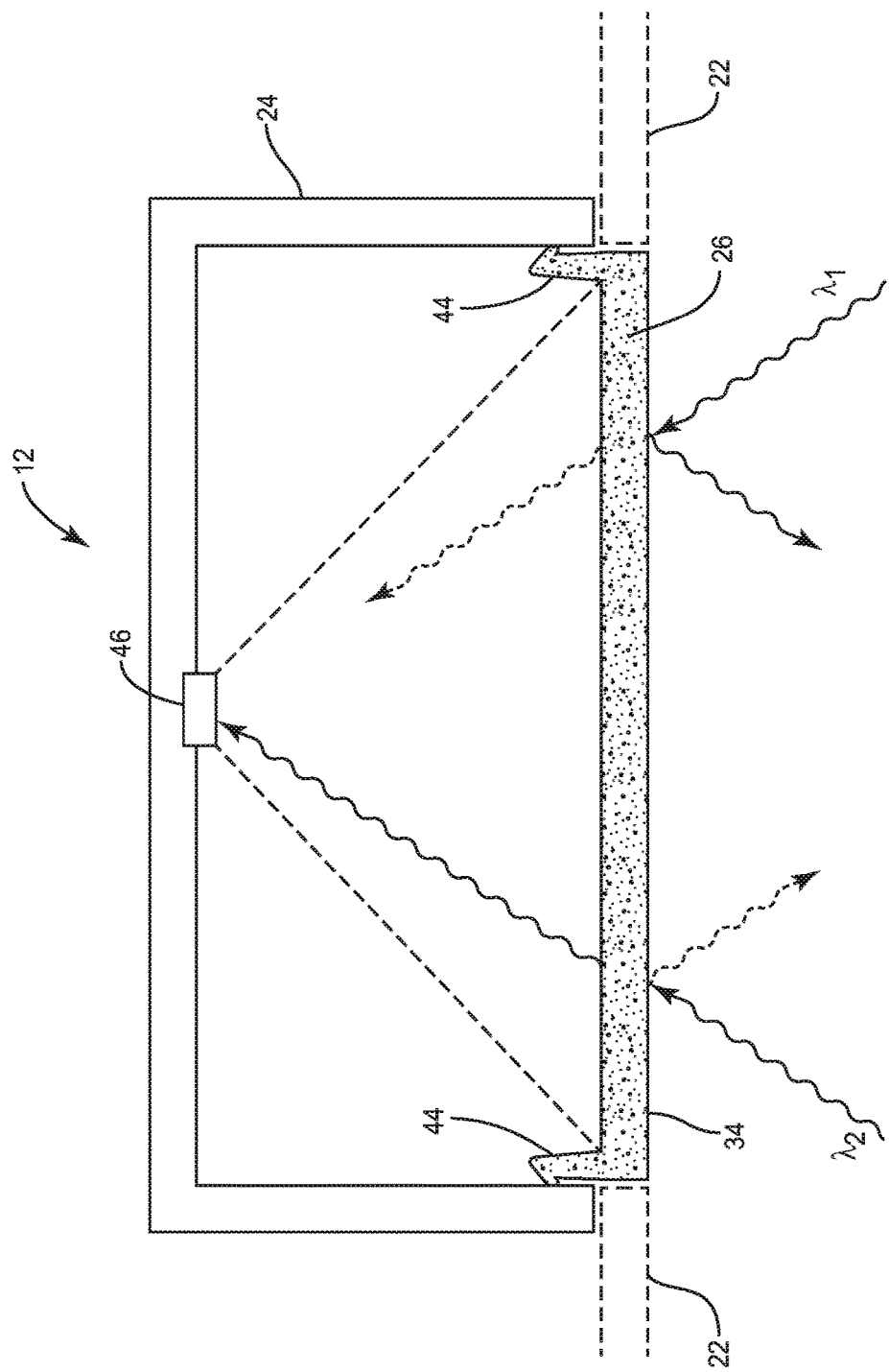
FIGS. 15A and 15B illustrate a cross-sectional view of a sensor module according to various embodiments of the present disclosure.

FIG. 15A shows the sensor module 12 according to one embodiment of the present disclosure. The sensor module 12 is substantially similar to that shown above with respect to FIG. 9, except that the sensor cover 26 shown in FIG. 15A includes coloring configured as described above. Specifically, FIG. 15A shows the sensor cover 26 wherein dyes or other materials are added to the sensor cover 26 during the manufacturing thereof such that the material of the sensor cover 26 and/or a material placed thereon is configured to reflect visible light within a first wavelength or band of wavelengths $\lambda_1$ while passing light within a second wavelength or band of wavelengths $\lambda_2$. Accordingly, visible light about the first wavelength or band of wavelengths $\lambda_1$ and incident to the front surface 34 of the sensor cover 26 is shown reflecting off the front surface 34. In some cases, only a portion of visible light about the first wavelength or band of wavelengths $\lambda_1$ is reflected by the sensor cover 26. Accordingly, FIG. 15A shows a portion of the incident visible light about the first wavelength or band of wavelengths $\lambda_1$ passing through the sensor cover 26. The portions of light about the first wavelength or band of wavelengths $\lambda_1$ reflected from the sensor cover 26 determine the perceived color of the sensor cover 26. Light about the second wavelength or band of wavelengths $\lambda_2$, which may be visible or non-visible light in various embodiments, is shown passing through the sensor cover 26 and to the sensor 46. In some cases, only a portion of light about the second wavelength or band of wavelengths $\lambda_2$ is passed by the sensor cover 26. Accordingly, FIG. 15A shows a portion of the incident light about the second wavelength or band of wavelengths $\lambda_2$ reflecting off the front surface 34 of the sensor cover 26.

In one embodiment, the first wavelength or band of wavelengths $\lambda_1$ includes visible light between about 380 nm and 780 nm. The second wavelength or band of wavelengths $\lambda_2$ may include visible light between 380 nm and 780 nm, infrared energy between 780 nm and 1000 nm, and thermal infrared energy between 1000 nm and 14 μm. The average transmittance of the sensor cover 26 may be greater than 10% and less than 90%. Average transmittance defines how much (on average) radiant energy received by a particular surface is passed through the surface. Accordingly, the average transmittance of the sensor cover 26 determines how much visible light, infrared energy, and/or thermal infrared energy is received by the sensor 46. As discussed above, the sensor 46 must receive a minimum amount of energy in order to remain functional. The particular coloring used for the sensor cover 26 takes this into consideration, striking a balance between matching the hue of the lighting fixture 10 and providing a minimum amount of energy to the sensor 46.

Figure 15B:
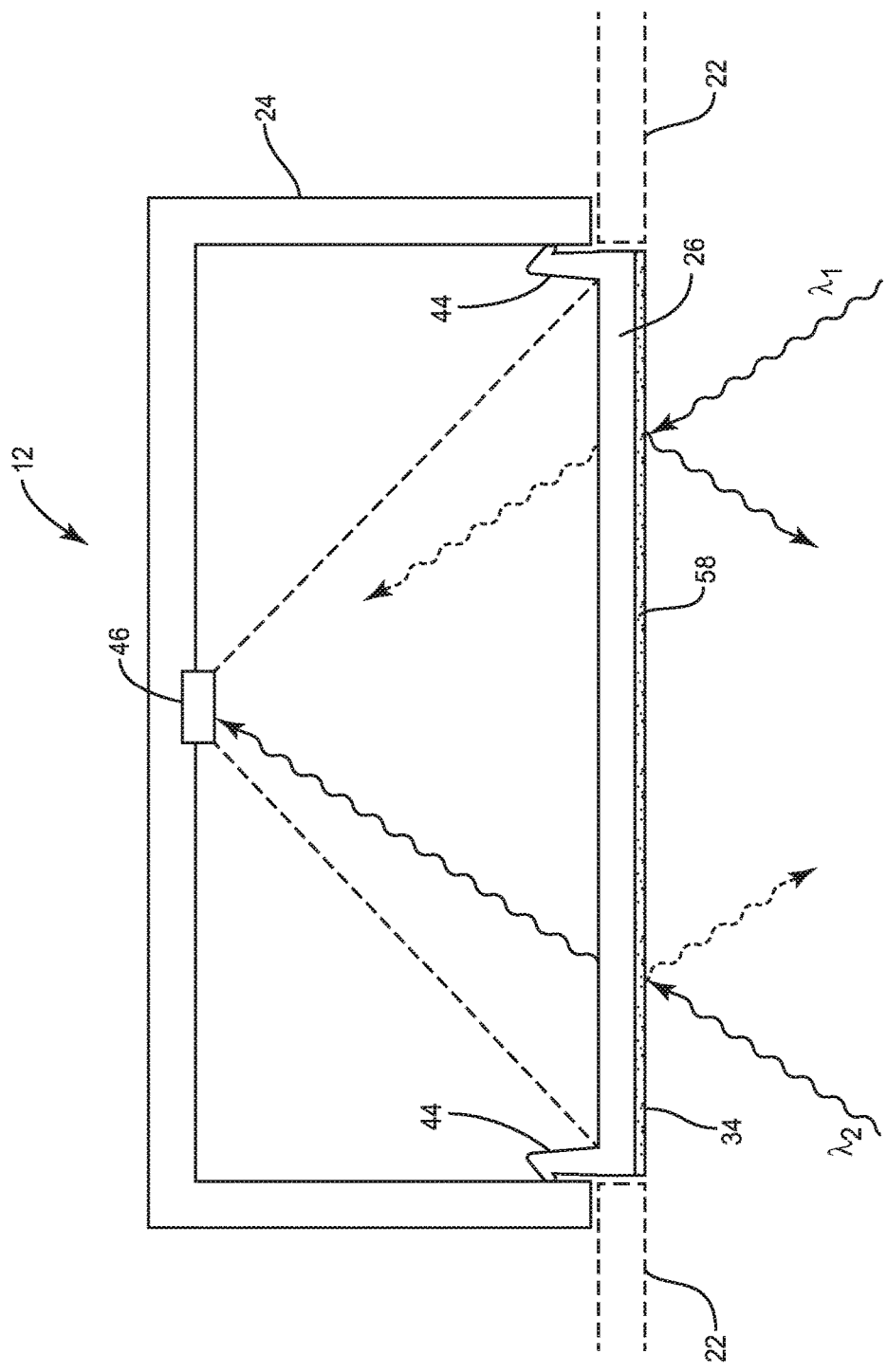

FIG. 15B shows the sensor module 12 according to another embodiment of the present disclosure. The sensor module 12 shown in FIG. 15B is substantially similar to that shown in FIG. 15A, except that the coloring of the sensor module 26 is accomplished via a thin-film layer 58. The thin-film layer 58 may be a paint or dye that has been applied to the front surface 34 of the sensor cover 26, or may be a separate piece of material that is applied to the front surface 34 of the sensor cover 26, for example, via an adhesive. The sensor cover 26 shown in FIG. 15B behaves similarly to that described above with respect to FIG. 15A, wherein the sensor cover 26 reflects visible light within a first wavelength or band of wavelengths $\lambda_1$ while passing light within a second wavelength or band of wavelengths $\lambda_2$ through the sensor cover 26 and to the sensor 46. In some embodiments, the front surface 34 of the sensor cover 26 may be slightly recessed from the exposed surface of the annular flange 22 such that even with the thin-film layer 58 applied the sensor cover 26 sits substantially flush with the surface of the annular flange 22.

As is clear from the description above, particular wavelengths or bands of wavelengths may be reflected in order to produce a desired hue of the sensor cover 26. This may result in skewed readings from the sensor 46. In order to correct for this phenomena, a light filter with a filter response that is the inverse of that of the sensor cover 26 may be provided over the sensor 46. In other embodiments, circuitry coupled to the sensor 46, such as the control circuitry 56 illustrated above in FIG. 14, may be configured to adjust an output response thereof in order to correct for the missing or attenuated wavelengths or bands of wavelengths reflected by the sensor cover 26. In other embodiments, such adjustments may be made in software executed by processing circuitry located within an imaging sensor or the control circuitry 56.

There are many ways to measure the perceived color of an object. One way is using a hue-saturation-lightness (HSL) cylindrical-coordinate representation. HSL coordinates include a radial distance corresponding to a color saturation, an angle corresponding a hue, and a height corresponding with a light value (i.e., lightness). In one embodiment, the hue angle representative of the color of the sensor cover 26 is less than 90° from the hue angle representative of the color of the surface of the lighting fixture 10 to which the sensor cover 26 is attached. In various embodiments, the hue angle representative of the color of the sensor cover 26 may differ by less than 45°, less than 30°, and less than 15° from that of the hue angle representative of the color of the surface of the lighting fixture 10 to which the sensor cover 26 is attached. Accordingly, the sensor cover 26 may appear substantially similar to the surface of the lighting fixture 10 with which it is integrated, and in some cases, may be indistinguishable therefrom.

Figure 16B:
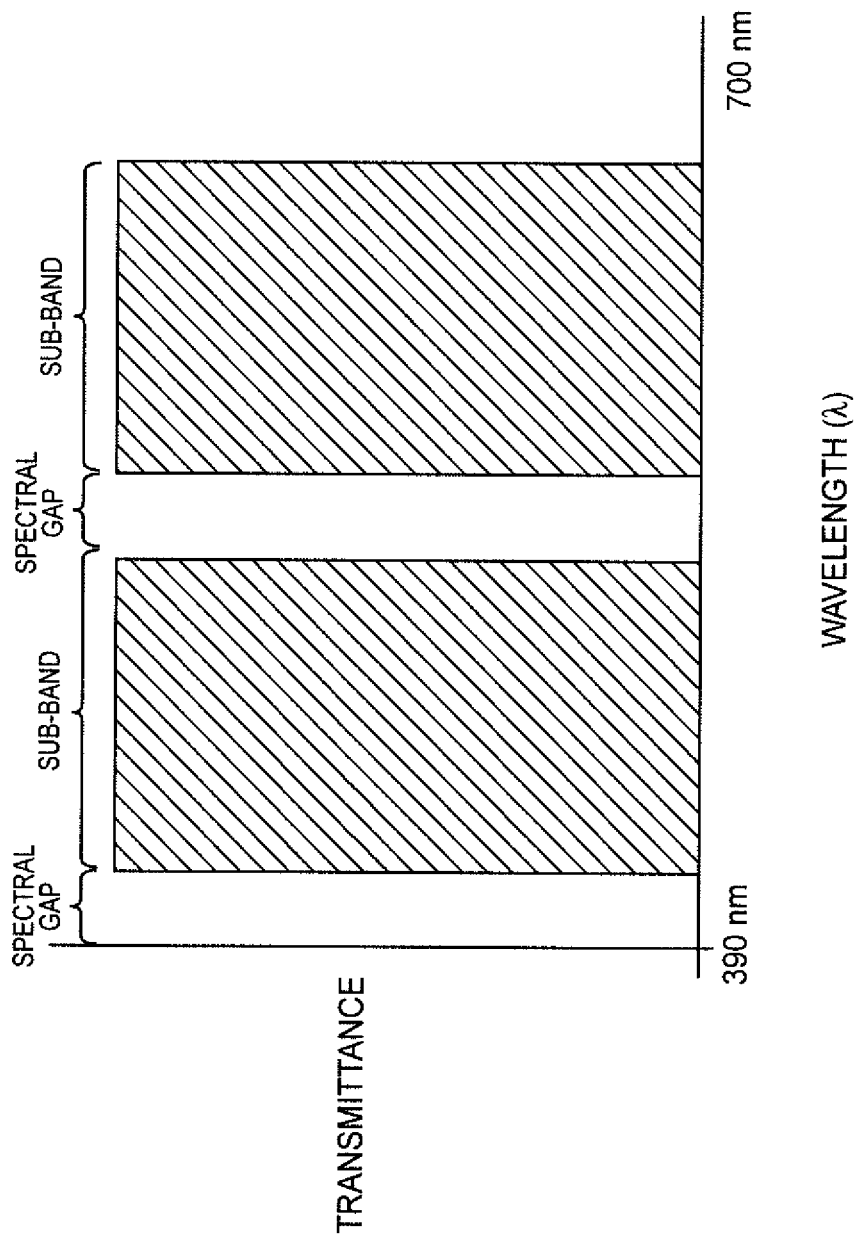

One way to provide the sensor cover 26 having a desired perceived color while still providing adequate average transmittance is by providing a number of spectral gaps between various reflected wavelengths or bands of wavelengths from the sensor cover 26, as illustrated in FIGS. 16A and 16B. Specifically, FIG. 16A is a graph illustrating the reflectance of an exemplary sensor cover 26 over the visual light spectrum, while FIG. 16B is a graph illustrating the average transmittance of the same exemplary sensor cover 26. As shown, the spectral transmittance is complementary to the spectral reflectance. Accordingly, those bands not reflected by the sensor cover 26 are transmitted through the sensor cover 26 (assuming zero absorbance). By coloring the sensor cover 26 such that specific wavelengths or bands of wavelengths are reflected therefrom, the sensor cover 26 may be provided at a desired perceived color. Further, by providing spectral gaps in the reflectance of the sensor cover 26, an adequate amount of energy may be provided to the sensor 46 such that the sensor 46 is capable of functioning properly. In various embodiments, the spectral gaps may be provided in one or more desired transmittance bands, such as within the visual light band between 380 nm and 780 nm, within the infrared energy band between 780 nm and 1000 nm, and/or within the thermal infrared energy band between 1000 nm and 14 μm.

Another way to aesthetically blend the appearance of the sensor cover 26 and an exterior surface of the lighting fixture 10 is to provide a continuous visual pattern over the exterior surface and the sensor cover 26. Accordingly, FIGS. 17A and 17B show the lighting fixture 10 including a visual pattern 60 over the exterior surface of the annular flange 22 and the front surface 34 of the sensor cover 26. Specifically, FIG. 17A shows the lighting fixture 10 in which a visual pattern 60 of lines is over the exterior surface of the annular flange 22 and the sensor cover 26, while FIG. 17B shows the lighting fixture 10 in which a visual pattern 60 of dots or specs, which resemble those found on the surface of drop-ceiling tiles, is over the exterior surface of the annular flange 22 and the sensor cover 26. As described herein, a "continuous" visual pattern is one that is substantially uninterrupted by the border between an exterior surface of the lighting fixture 10 and the sensor cover 26. While only two visual patterns 60 are shown for reference, any number of different visual patterns 60 may be over an exterior surface of the lighting fixture 10 and the sensor cover 26 without departing from the principles of the present disclosure. For example, stripes of any orientation, decorative designs, noise/static, or any other pattern may be over an exterior surface of the lighting fixture 10 and the sensor cover 26 without departing from the principles of the present disclosure. The visual pattern 60 may be chosen based on the type of surrounding in which the lighting fixture 10 is installed. For example, the visual pattern 60 may be chosen to match a pattern or texture present on a ceiling in which the lighting fixture 10 is installed.

As the size of the sensor 46 and/or the sensor cover 26 decreases, the visual pattern 60 may allow the sensor cover 26 to essentially disappear within the visual pattern 60. For example, a sensor cover 26 having a radius of 5 mm, 3 mm, or even 1 mm may blend completely in with a visual pattern 60 including one or more shapes of about the same size. In other embodiments wherein the sensor cover 26 cannot be made sufficiently small, the continuous nature of the visual pattern 60 between the exterior surface of the lighting fixture 10 and the sensor cover 26 may create a visual appearance of continuity, which allows the sensor cover 26 to aesthetically blend with the lighting fixture 10.

The visual pattern 60 may be applied in any suitable manner without departing from the principles of the present disclosure. For example, the visual pattern 60 may be painted on, applied via a decal, etched on, or applied via any other suitable process. In one embodiment, the visual pattern 60 is applied on the front surface 34 of the sensor cover 26. In an additional embodiment, the visual pattern 60 is embedded in the material of the sensor cover 26.

Notably, because the focal point of the sensor 46 is far outside of the sensor cover 26, the visual pattern 60 will not affect the operation of the sensor 46 except for reducing the overall intensity of the light received by the sensor 46. At a certain point wherein the density and/or opacity of the visual pattern 60 reaches a certain threshold, the average transmittance of the sensor cover 26 will reach a critical value in which the intensity of the light received by the sensor 46 is diminished to the point where the sensor 46 can no longer function properly. Accordingly, a balance between the density and/or opacity of the visual pattern 60 must be struck with a desired intensity of light to be received by the sensor 46, as shown in Equation (1):

$$(P_{SCP} * T_P) + (P_{SCNP} * T_{SC}) = T_{AVE} \qquad (1)$$

where $P_{SCP}$ is the percentage of the sensor cover 26 covered by the visual pattern 60, $T_P$ is the average transmittance of the visual pattern 60, $P_{SCNP}$ is the percentage of the sensor cover 26 not covered by the visual pattern 60, $T_{SC}$ is the average transmittance of the sensor cover 26, and $T_{AVE}$ is the overall average transmittance of the sensor cover 26. In general, a balance must be struck between the density and/or opacity of the visual pattern 60 with the desired intensity of light to be delivered to the sensor 46. In one embodiment, the sensor cover 46 is designed such that the overall average transmittance $T_{AVE}$ of the sensor cover 26 is greater than about 10%. Generally, the overall average transmittance $T_{AVE}$ of the sensor cover 26 may be between about 10% and 90% while still providing adequate energy to the sensor 46.

Notably, the continuous pattern may be used along with the coloring described above to achieve further aesthetic blending of the sensor cover 26 with the lighting fixture 10. That is, in addition to providing the sensor cover 26 with coloring such that the perceived color of the sensor cover 26 matches that of an exterior surface of the lighting fixture 10, a continuous visual pattern may also be provided on the sensor cover 26 and the exterior surface.

Those skilled in the art will recognize improvements and modifications to the preferred embodiments of the present disclosure. All such improvements and modifications are considered within the scope of the concepts disclosed herein and the claims that follow.

What is claimed is:

1. A lighting fixture comprising:
   a light source;
   a housing coupled to the light source and comprising an opening through which light generated by the light source is emitted towards an area of interest having a plurality of sub-areas, wherein an exposed surface of the housing reflects the light such that the housing appears a first color;
   a light sensor, wherein data collected at the light sensor is used to control the light source; and
   a sensor cover over the light sensor and coupled to the housing, the sensor cover comprising:
      a front surface that reflects light within a first sub-band of a visual light band and transmits light within at least a second sub-band of the visual light band such that the sensor cover appears a second color, which is substantially similar to the first color based at least in part on reflectance within the first sub-band; and
      a light focusing surface opposite the front surface and comprising a plurality of lens sections, each of the lens sections configured to focus light from each sub-area of the plurality of sub-areas of the area of interest to the light sensor such that, in combination, the plurality of lens sections provide information to the light sensor about an entire area of the area of interest, where the sensor cover has an average transmittance greater than 10% within the visual light band.

2. The lighting fixture of claim 1 wherein the average transmittance of the sensor cover is less than about 90%.

3. The lighting fixture of claim 1 wherein a hue angle of the first color is less than 90° away from a hue angle of the second color as measured in a hue-saturation-lightness (HSL) coordinate system.

4. The lighting fixture of claim 1 wherein a hue angle of the first color is less than 45° away from a hue angle of the second color as measured in a hue-saturation-lightness (HSL) coordinate system.

5. The lighting fixture of claim 1 wherein a hue angle of the first color is less than 15° away from a hue angle of the second color as measured in a hue-saturation-lightness (HSL) coordinate system.

6. The lighting fixture of claim 1 wherein the sensor cover is integrated into the housing.

7. The lighting fixture of claim 6 wherein the front surface of the sensor cover is configured to lay substantially flush with a surface of the housing.

8. The lighting fixture of claim 1 wherein the front surface of the sensor cover is substantially flat.

9. The lighting fixture of claim 1 wherein each one of the plurality of lens sections comprises a Fresnel lens.

10. The lighting fixture of claim 9 wherein each one of the plurality of lens sections has a unique Fresnel pattern.

11. The lighting fixture of claim 1 wherein the light sensor is an infrared occupancy sensor.

12. The lighting fixture of claim 1 wherein the exposed surface of the housing and the front surface of the sensor cover are covered in a continuous visual pattern.

13. A lighting fixture comprising:
   a light source;
   a housing coupled to the light source and comprising an opening through which light generated by the light source is emitted towards an area of interest having a plurality of sub-areas, wherein an exposed surface of the housing reflects the light such that the housing appears a first color;
   a light sensor, wherein data collected at the light sensor is used to control the light source; and
   a sensor cover over the light sensor and coupled to the housing, the sensor cover comprising:
      a front surface that reflects light within a first plurality of sub-bands of a visual light spectrum and transmits light within a second plurality of sub-bands of the visual light spectrum such that the sensor cover appears a second color, which is substantially similar to the first color, based on reflectance within the first plurality of sub-bands; and a light focusing surface opposite the front surface and comprising a plurality of lens sections, each of the lens sections configured to focus light from each sub-area of the plurality of sub-areas of the area of interest to the light sensor such that, in combination, the plurality of lens sections provide information to the light sensor about an entire area of the area of interest where each one of the first plurality of sub-bands are separated from each other by one of the second plurality of sub-bands.

* * * * *